US009146846B2

(12) United States Patent
Loh et al.

(10) Patent No.: US 9,146,846 B2
(45) Date of Patent: Sep. 29, 2015

(54) PROGRAMMABLE PHYSICAL ADDRESS MAPPING FOR MEMORY

(75) Inventors: Gabriel H. Loh, Bellevue, WA (US); Mauricio Breternitz, Jr., Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 121 days.

(21) Appl. No.: 13/617,673

(22) Filed: Sep. 14, 2012

(65) Prior Publication Data

US 2014/0082322 A1 Mar. 20, 2014

(51) Int. Cl.
G06F 12/06 (2006.01)
G06F 12/00 (2006.01)
G06F 12/02 (2006.01)

(52) U.S. Cl.
CPC ............ *G06F 12/00* (2013.01); *G06F 12/0207* (2013.01); *G06F 12/0653* (2013.01); *G06F 2212/1016* (2013.01)

(58) Field of Classification Search
CPC ............ G06F 12/0207; G06F 12/0646; G06F 12/0653; G06F 12/10; G06F 2212/1016
USPC ................ 711/5, 202, E12.003, E12.058
See application file for complete search history.

(56) References Cited

U.S. PATENT DOCUMENTS

| | | | |
|---|---|---|---|
| 7,426,583 B1 * | 9/2008 | Dutra et al. ................ 710/3 |
| 2006/0236072 A1 * | 10/2006 | Lyon ........................ 711/206 |
| 2008/0168249 A1 * | 7/2008 | Hirzel et al. .............. 711/170 |
| 2009/0319718 A1 * | 12/2009 | Aldworth et al. ........... 711/5 |
| 2010/0177584 A1 * | 7/2010 | Lee et al. .................. 365/226 |
| 2011/0157200 A1 * | 6/2011 | Hur et al. .................. 345/543 |
| 2011/0252180 A1 * | 10/2011 | Hendry et al. ............. 711/3 |
| 2012/0317367 A1 * | 12/2012 | Grayson et al. ........... 711/143 |
| 2013/0246734 A1 * | 9/2013 | Schaefer et al. ........... 711/206 |

OTHER PUBLICATIONS

J. Carter et al., "Impulse:Building a Smarter Memory Controller," High-Performance Computer Architecture, Fifth International Symposium, pp. 70-79, Jan. 1999.
S. Che et al., "Dymaxion: Optimizing Memory Access Patterns for Heterogeneous Systems," In Proceedings of the ACM/IEEE International Conference for High Performance Computing, Networking, Storage and Analysis (SC), Nov. 2011.

* cited by examiner

*Primary Examiner* — Hal Schnee

(57) ABSTRACT

A memory implements a programmable physical address mapping that can change to reflect changing memory access patterns, observed or anticipated, to the memory. The memory employs address decode logic that can implement any of a variety of physical address mappings between physical addresses and corresponding memory locations. The physical address mappings may locate the data within one or more banks and rows of the memory so as to facilitate more efficient memory accesses for a given access pattern. The programmable physical address mapping employed by the hardware of the memory can include, but is not limited to, hardwired logic gates, programmable look-up tables or other mapping tables, reconfigurable logic, or combinations thereof. The physical address mapping may be programmed for the entire memory or on a per-memory region basis.

17 Claims, 7 Drawing Sheets

ACCESS SEQUENCE:
(Z-MORTON)
1) ADDR A
2) ADDR B
3) ADDR E
4) ADDR F
5) ADDR C
6) ADDR D
7) ADDR G
8) ADDR H
9) ADDR I
10) ADDR J
11) ADDR M
12) ADDR N
13) ADDR K
14) ADDR L
15) ADDR O
16) ADDR P
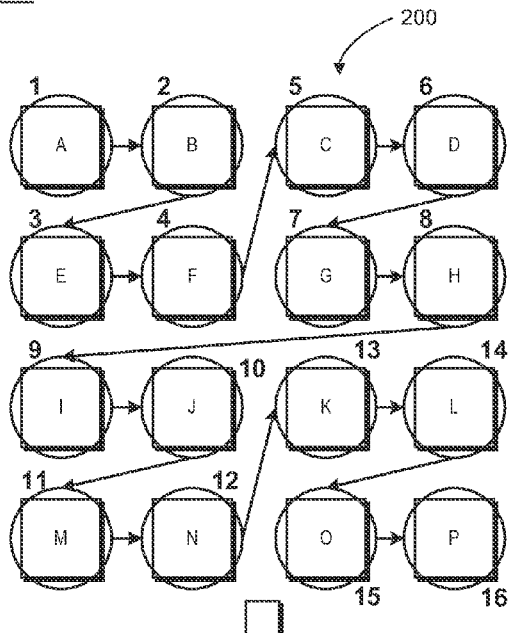
FIG. 4
SET TO Z-MORTON MAPPING
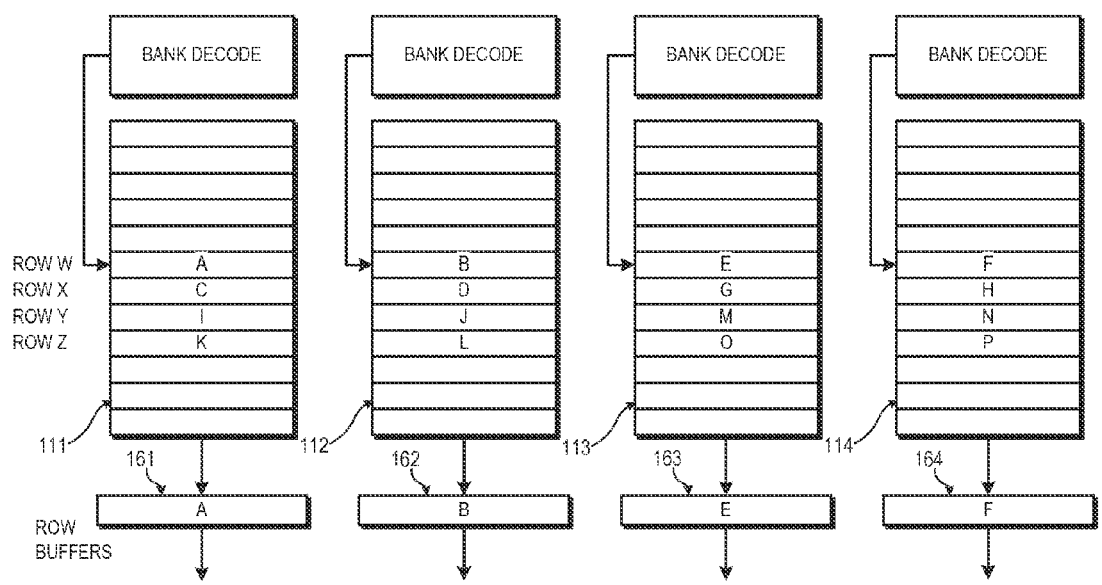

PROGRAMMABLE PHYSICAL ADDRESS MAPPING FOR MEMORY

BACKGROUND

1. Field of the Disclosure

The present disclosure generally relates to memory, and, more particularly, to mapping of physical addresses to memory locations in a memory with one or more banks.

2. Description of the Related Art

Many memory architectures are organized into one or more banks, both at the structural level and the silicon implementation level. Typically, a physical address is uniquely mapped to a corresponding row of a corresponding bank. The mapping of physical addresses to corresponding bank/row locations generally is selected at design time and remains fixed. Certain memory architectures, such as dynamic random access memory (DRAM)-based architectures and phase change memory architectures, have certain set-up requirements that cause successive accesses to different rows of the same bank to take considerably longer than successive accesses to the same row. Further, some memory architectures utilize a row buffer to buffer data at an activated row of a bank, thereby allowing a successive access to a different bank at the same row to process with respect to the row buffer, rather than requiring direct access to the bank itself. In view of the advantages of having successive memory accesses directed to the same row, some software applications adjust the data layout in memory so as to render successive accesses by a software application to the same row more likely. However, this approach requires software modifications in the operating system, compiler, or runtime software, as welt as requiring the software designer to have foreknowledge of both the likely access pattern for the data and the memory address redirection needed to optimize the access pattern. Moreover, this approach only benefits those software applications specifically designed and compiled in this manner.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating an example physical address mapping employed in anticipation of a space tiling memory access pattern in accordance with some embodiments of the present disclosure.

DETAILED DESCRIPTION

Figure 1:
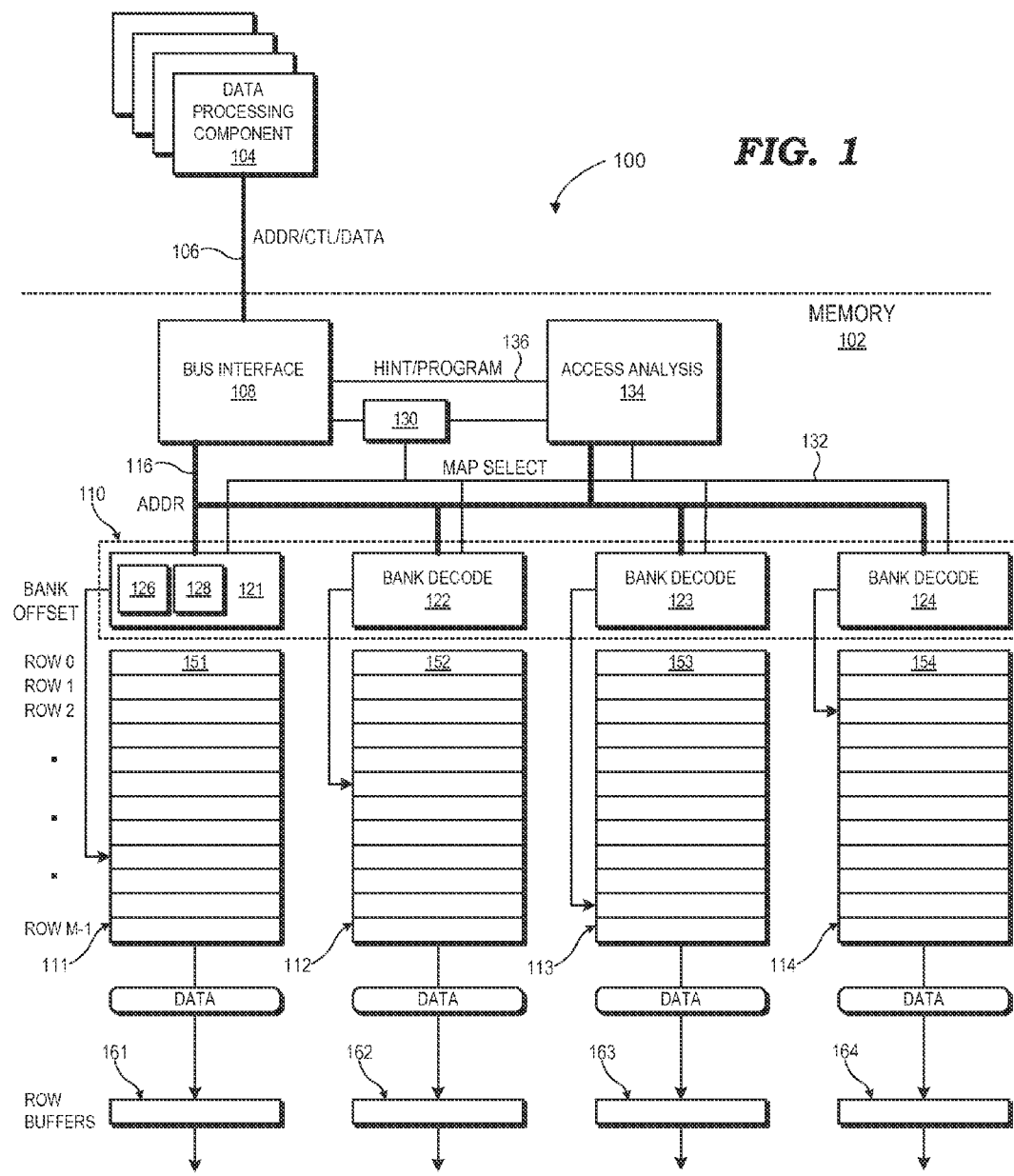
FIG. 1 is a block diagram of a data processing system employing a multiple-bank memory with programmable physical address mapping in accordance with some embodiments of the present disclosure.

FIGS. 1-8 illustrate example implementations of a multiple-bank memory having a programmable physical address mapping so as to enable the mapping of physical addresses to banks and rows to change to reflect changing access patterns, observed or anticipated, to the memory. In some embodiments, the memory employs address decode logic that can implement any of a variety of physical address mappings between physical addresses and corresponding memory locations. The physical address mappings may locate the data within the banks and rows of the memory so as to facilitate more efficient memory accesses for a given access pattern. For example, because dynamic random access memory (DRAM)-based architectures often incur an access penalty when different rows of the same bank are accessed in sequence, the physical address mapping may place data expected to be accessed in sequence in the same row across multiple banks, thereby reducing or avoiding this access penalty. The programmable physical address mapping employed by the hardware of the memory can include, but is not limited to, hardwired logic gates, programmable look-up tables or other mapping tables, reconfigurable logic (e.g., a programmable logic array), or combinations thereof. The physical address mapping may be programmed on per-memory region basis. For example, in a page-based memory, the physical address mapping may be independently programmed for each page.

In some embodiments, the programmable physical address mapping employed by the memory can be dynamically changed in response to changing access conditions. Memory accesses can be analyzed to determine an access pattern, such as a stride pattern. In the event that there is a more optimal physical address mapping that can be implemented for the access pattern, the memory can be reprogrammed to employ the more optimal physical address mapping. In some embodiments, such analysis and dynamic reprogramming of the physical address mapping is performed by the memory hardware independent of any software executing in the system (that is, is not software-visible). As such, a more optimal physical address mapping can be employed without requiring software optimization or recompilation to take advantage of this feature. In certain implementations, access pattern hint information from software may be used by the memory hardware to select an appropriate physical address mapping.

In some embodiments, the memory is programmed to implement a physical address mapping that more fully optimizes memory access efficiency by arranging successive memory accesses to access the memory structure in a manner that reduces or minimizes access delays. To illustrate, DRAM architectures and phase change memory architectures often exhibit a same-bank, different-row bias such that successive accesses to different banks are much faster than successive accesses to different rows of the same bank due to the need to close one row and activate the next row when there is a row change at a bank between one memory access and the next.

Further, memory architectures that implement row buffers can exhibit even greater memory access efficiency by increasing the number of successive memory accesses to the same row of a bank, as such accesses can be performed using the row buffer. In these circumstances, the physical address mapping programmed for the memory 102 may attempt to locate multiple data elements anticipated to be accessed in sequence in the same row of the same bank of the memory, when possible, so as to take advantage of the higher access speeds of row buffer accesses. Examples of this approach can include selecting between mappings that either align row-major or column-major data into the same row/bank for better spatial locality, or to organize data in the memory so that its row-based orientation is more compatible with a space tiling pattern, such as a Morton pattern or Hilbert pattern, so as to more fully enable efficient memory access during stencil computations, which typically require access to neighboring elements in a bidimensional organization.

FIG. 1 illustrates a data processing system 100 employing hardware-implemented programmable physical address mapping in accordance with some embodiments of the present disclosure. In the depicted example, the data processing system 100 includes a memory 102 connected to one or more data processing components 104 via one or more memory busses 106. The memory 102 comprises a memory architecture whereby a set of memory cells is arranged into a plurality of rows and one or more banks. The memory 102 can comprise any of a variety of memory types typically employed in a data processing system. For example, the memory 102 can include system random access memory (system RAM), or "main memory," and the data processing components 104 can include, for example, one or more processors and peripheral components that utilize the main memory to store data and instructions. As another example, the memory 102 can include a cache memory and the data processing components 104 can include, for example, one or more processor cores, a northbridge, a southbridge, an input/output interconnect, and the like, that utilize the cache memory to cache data and instructions. Thus, the term "bank" is used herein to inclusively refer to the column-based partitions of the rows of a memory, whether system memory or cache memory.

In the illustrated embodiment, the memory 102 includes a bus interface 108, programmable address decode logic 110, and one or more banks, such as the four banks 111, 112, 113, and 114 illustrated in FIG. 1. Each of the banks comprises a plurality of rows, such the rows 0 to M−1 illustrated in FIG. 1. The portion of the memory at a given bank/row combination is referred to herein as a "memory location." For example, memory locations 151, 152, 153, and 154 represent the memory locations at banks 111, 112, 113, and 114, respectively, relative to row 0. Each memory location comprises a plurality of memory cells to store data (and may also store status bits or control information). The memory 102 further may include row buffers, such as row buffers 161, 162, 163, and 164 for banks 111-114, respectively, whereby each row buffer is configured to store the data at the accessed row of a corresponding bank. To illustrate, an access to row 0 of bank 111 would result in the output of the data at each of memory location 151 for temporary storage in the row buffer 161. Likewise, accesses to row 0 of banks 112, 113, and 114 would result in the output of the data at each of memory locations 152, 153, and 154 for temporary storage in the row buffers 162, 163, and 164, respectively.

The bus interface 108 includes an interface coupleable to the memory bus 106 so as to communicate signaling between the memory 102 and the data processing components 104. This signaling can include memory access requests from the data processing components 104 in the form of address signaling, control signaling, and, in the case of a write access, write data signaling representing the write data to be stored at the memory 102 for the write access request. Further, this signaling can include memory access completion signaling, such as a confirmation of completion of a memory access or, in the case of a read access, read data signaling representing the read data accessed from the memory 102 for the requested read access. The bus interface 108 further includes an output to provide address signaling ADDR (signal 116 in FIG. 1) representing at least portions of physical addresses associated with memory access requests signaled by the data processing components 104. Although FIG. 1 illustrates an example implementation whereby the components supporting programmable physical address mapping are implemented in the memory 102, some or all of these components may be implemented in other components of the data processing system 100. To illustrate, some or all of the components of the programmable address decode logic 110 or the access analysis module 134 (described below) can be implemented in, for example, the memory controller of a unified northbridge (UNB) of a data processing component 104. In such implementations, one or more of the bank offset signaling, bank select signaling, and map select signaling described below can be communicated from the external component to the bus interface 108 via the memory bus 106, and whereby the bus interface 108 or other component of the memory 102 then implements the memory access to the indicated bank and row based on this signaling in accordance with the techniques described herein.

The programmable address decode logic 110 comprises hardware configured to decode the address ADDR to identify the memory location (that is, the particular bank/row combination) to be accessed in response to a memory access request. In some embodiments, the programmable address decode logic 110 identifies the memory location based on a programmed physical address mapping between physical addresses and bank/row combinations. As described in greater detail herein, the programmed physical address mapping implemented by the programmable address decode logic 110 at any given time can include a physical address mapping selected from a plurality of preconfigured or predetermined physical address mappings (via, e.g., hardcoded logic gates or hardcoded mapping tables), a physical address mapping that can be configured dynamically (via, e.g., custom programming of a mapping table or custom programming of reconfigurable logic), or a combination of preconfigured and modifiable physical address mappings.

In the illustrated example, the programmable address decode logic 110 includes bank decode logic for each bank of the memory 102, such as bank decode logic 121, 122, 123, and 124 for banks 111, 112, 113, and 114, respectively. Each bank decode logic includes bank select logic 126 and bank offset logic 128. The bank select logic 126 determines whether the corresponding bank is to be accessed based on the physical address ADDR and the implemented physical address mapping. The bank offset logic 128 determines a bank offset identifying the row to be accessed based on the physical address ADDR and the implemented physical address mapping in the event that the bank select logic 126 identifies the corresponding bank as the bank to be accessed.

In some embodiments, the address decode logic 110 includes a programmable storage element 130, such as a one or more latches, one or more registers, one or more fuses or anti-fuses, or a cache or other table storage structure. The programmable storage element 130 stores a selected mapping indicator that identifies the physical address mapping to be implemented by the bank decode logic 121-124. The mapping indicator, or a representation thereof, is distributed to the bank decode logic 121-124 as a map select signal 132. The programmable storage element 130, in some embodiments, is memory mapped or otherwise accessible to the data processing components 104 so that a software-driven or hardware-driven process at a data processing component 104 can set the physical address mapping by writing a corresponding mapping indicator value to the programmable storage element 130. For example, during start up from reset, one of the data processing components 104 may store a mapping indicator value to the programmable storage element 130 to set the memory 102 to implement a default physical address mapping as part of a basic input-output system (BIOS) process executed by the data processing component 104. As another example, an application executing at the data processing component 104 may store a mapping indicator value to the programmable storage element 130 during execution to program the memory 102 to implement a selected physical address mapping expected to provide more efficient memory accesses for an anticipated memory access sequence or pattern.

Further, as described in greater detail below, the memory 102 may implement access analysis logic 134 that analyzes access patterns to identify whether a more suitable physical address mapping should be implemented, and if so, store a corresponding mapping indicator value to the programmable storage element 130 to reprogram the memory 102 to use the identified physical address mapping. Moreover, a data processing component 104 may supply memory utilization hint information 136 that identifies or suggests a memory access pattern anticipated by the data processing component 104. For example, graphics processing software executing on the data processing component 104 may be configured so as to provide an indicator of a space tiling based access pattern, such as a Hilbert access pattern, in anticipation of the application of a filter to an image stored, or to be stored, in the memory 102. In response, the access analysis logic 134 can program an appropriate physical address mapping for storing the pixel data for the image so as to more fully ensure efficient memory accesses to the image data by the graphics processing software while applying the filter.

In some embodiments, the bank select logic 126 and the bank offset logic 128 implement multiple predefined physical address mappings using hardcoded logic gates that provide various mappings between physical addresses and corresponding bank/row combinations. In this instance, the map select signal 132 can be used as an input to the hardcoded logic gates to control the hardcoded logic gates to implement the physical address mapping represented by the mapping indicator stored in the programmable storage element 130. In another embodiment, the programmable address decode logic 110 implements a plurality of preconfigured mapping tables, each preconfigured mapping table representing a corresponding predefined physical address mapping. For example, the preconfigured mapping tables can be implemented as look-up tables indexed by the bank select logic 126 and the bank offset logic 128 using a physical address to identify the bank and row mapped to that physical address. In some embodiments, each bank decode logic locally stores its own copy of these preconfigured mapping tables in a storage element (not shown) associated with each bank decode logic. In this instance, the map select signal 132 controls which preconfigured mapping table is used by the bank decode logic.

Instead of, or in addition to, using hardcoded or preconfigured mappings, the programmable address decode logic 110 can enable the dynamic configuration of a physical address mapping. For example, in some embodiments, the programmable address decode logic 110 can implement a look-up table or other mapping table that can be dynamically programmed to implement a custom physical address mapping. In this case, the bank select logic 126 and the bank offset logic 128 access this programmable mapping table to identify the bank and row mapped to a physical address under the physical address mapping represented by the configured mapping table. The programmable mapping table can be programmed by, for example, a data processing component 104 or by a hardware component of the memory 102, such as the access analysis logic 134. Thus, rather than selecting between multiple preconfigured mapping tables, the physical address mapping implemented by the memory 102 can be reconfigured by overwriting the same mapping table. In another embodiment, the programmable address decode logic 110 implements reconfigurable logic, such as a programmable logic array (PLA) or field-programmable gate array (FPGA), to provide the physical address mapping. In this instance, the physical address mapping can be implemented by programming the reconfigurable logic to represent the desired physical address mapping.

In addition to, or instead of, the static assignment of a physical address mapping by one of the data processing components or by hardware of the memory 102, the memory 102 can dynamically change or modify the implemented physical address mapping in order to, for example, more fully optimize the placement of data in the memory 102 in view of an anticipated memory access pattern. The access analysis logic 134 monitors memory accesses to determine whether recent memory accesses exhibit a particular pattern. To illustrate, the access analysis logic 134 can search for a strided access pattern or search for a space tiling access pattern, such as an access pattern indicative of a Z-Morton, X-Morton, U-Morton, or a Hilbert access pattern. In response to detecting a specified access pattern, the access analysis logic 134 can select a physical address mapping that more fully optimizes memory accesses having the specified access pattern. For example, in response to detecting that recent memory accesses are exhibiting a stride pattern with a stride equal to 1, the access analysis logic 134 may program the programmable address decode logic 110 to implement a row-major physical address mapping, whereas in response to detecting a stride pattern greater than 1, the access analysis logic 134 may reprogram the programmable address decode logic 110 to implement a column-major physical address mapping.

The physical address mapping implemented at the memory 102 typically is selected so as to improve the efficiency of successive memory accesses in view of the limitations in the process used to access memory locations in the particular memory architecture implemented for the memory 102. To illustrate, DRAM and phase change memory architectures typically are subject to delay penalties when different rows in the same bank are accessed in sequence due to the time needed to precharge or close one row and then activate the next row. Accordingly, to more fully optimize memory access efficiency, the memory 102 can select a physical address mapping that improves spatial locality by placing data expected to be successively accessed in memory locations in the same row so as to reduce bank conflicts. Likewise, in embodiments whereby the memory 102 implements row buffers, a physical address mapping that increase the frequency at which successive accesses hit on the same row provides even greater memory efficiency by increasing the row buffer hit rate.

To illustrate, stencil computations operating on a bidimensional data structure usually access data in the neighborhood of each point. A memory access usually fetches a block of consecutive elements from the memory. For example, applying a filter to an image (one example of a bidimensional data structure) at point A[I,J] may require access to elements A[I+1,J], A[I−1,J], A[I,J+1] and A[I,J−1]. In the conventional row-major storage of matrices, elements A[I,J], A[I,J+] and A[I,J−1] are likely to be contiguous and can usually be fetched with one memory access, whereas elements A[I+1,J] and A[I−1,J] each would require a separate memory access. Thus, the application of the filter at point A[I,J] would require three separate full memory accesses: one to access element A[I,J], A[I,J+1] and A[I,J−1] from the same row; one to access element A[I+1,J] from a second row; and one to access A[I−1,J] from a third row. However, with the knowledge or anticipation that this filter operation is to be performed, the physical address mapping can be programmed on as to store, for example, elements A[I,J], A[I,J+1] and A[I,J−1] on one row of one bank and elements A[I+1,J] and A[I−1,J] at a row of another bank, and thus would require only two full memory accesses to apply the filter using these data elements, or a 33% reduction in full memory accesses. A similar approach may be used to more fully optimize memory accesses for various space tiling patterns, such as the Z-Morton, X-Morton, U-Morton, and Hilbert space tiling patterns.

Figure 2:
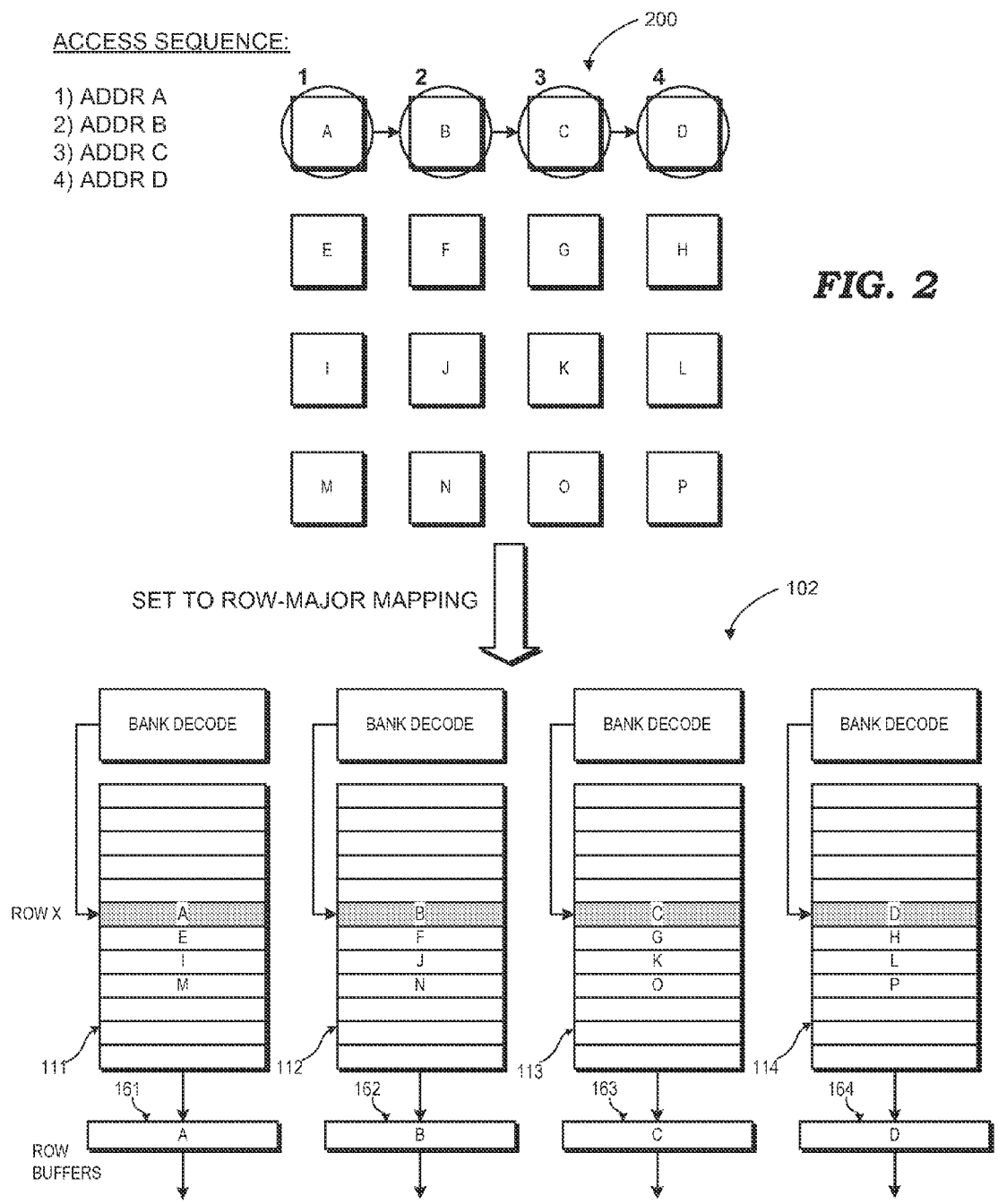
FIG. 2 is a diagram illustrating an example physical address mapping employed in anticipation of a row-major memory access pattern in accordance with some embodiments of the present disclosure.
Figure 3:
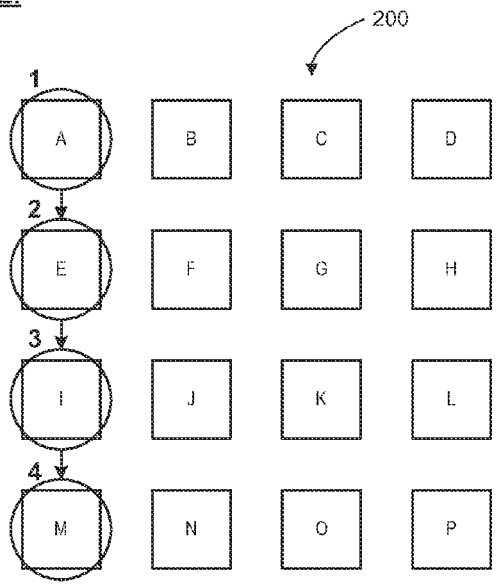
FIG. 3 is a diagram illustrating an example physical address mapping employed in anticipation of a column-major memory access pattern in accordance with some embodiments of the present disclosure.
Figure 3:
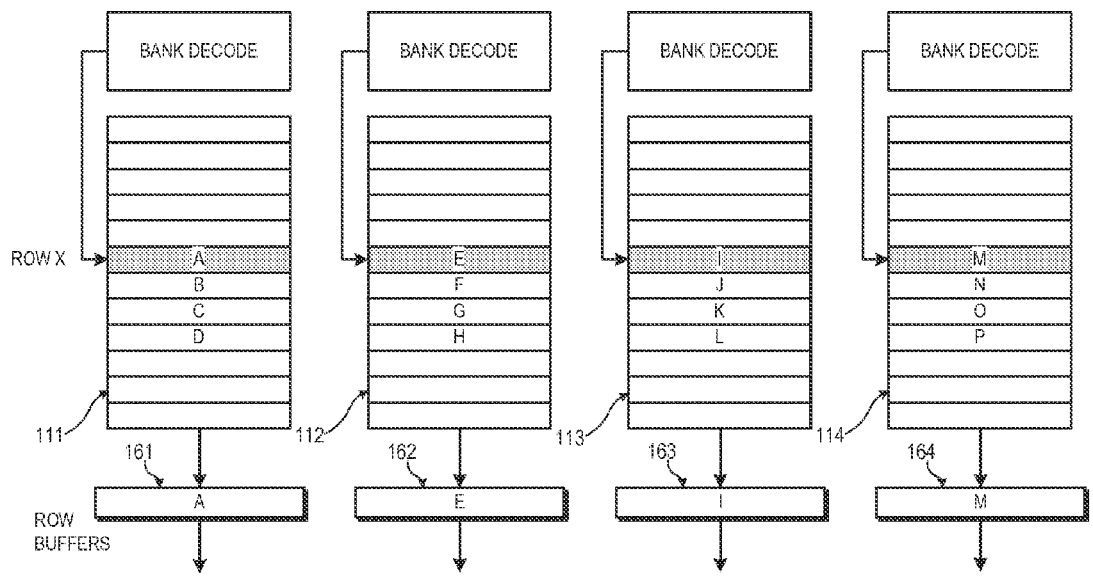

FIGS. 2-4 illustrate various example physical address mappings which the memory 102 may employ to improve memory access efficiency in anticipation of corresponding access patterns. Each of these examples is described with reference to an example bidimensional array 200 of sixteen data elements A-P arranged in four rows and four columns.

FIG. 2 illustrates an example a row-major access sequence in a single row of the array 200 in the order: (1) data element A; (2) data element B; (3) data element C; and (4) data element D. As this access sequence occurs on the same row of the array 200, the memory 102 may be programmed to implement a row-major physical address mapping that results in the physical addresses associated with each of data elements A, B, C, and D mapping to different banks, such that the physical address for data element A is mapped to the memory location at bank 111/row X, the physical address for data element B is mapped to the memory location at bank 112/row X, the physical address for data element C is mapped to the memory location at bank 113/row X, and the physical address for data element D is mapped to the memory location at bank 114/row X. The physical addresses for the data elements of the other rows of the array 200 may be similarly mapped to corresponding banks of the memory 102. Note that although FIG. 2 shows the physical addresses associated with each of data elements A, B, C, and D mapping to the same row X for ease of illustration, the physical addresses can map to different rows for the different banks. For example, data element A could map to row X of bank 111, data element B could map to row Y or bank 112, etc.

Under the physical address mapping described above, each memory access in the sequence of memory accesses to access data elements A, B, C, and D each maps to a different bank, and thus avoids the bank conflicts that otherwise would arise if two or more of the data elements A, B, C, and D were stored in the same bank. Moreover, the programmable physical address mapping can be further exploited in the event that a row can store more than one data element and a row buffer is implemented. For example, the row-major physical address mapping can provide for data elements A and B to be stored to a row of bank 111 and data elements C and D to be stored to a row of bank 113. When a memory accesses is initiated to access the data element A from the row of bank 111, data elements A and B are stored in the row buffer 161, and thus the next memory access for data element B can hit on the row buffer 161. Likewise, the memory access to access the data element C allows the following memory access to access data element D to hit on the row buffer 163 in which the data elements C and D would be stored.

FIG. 3 illustrates an example column-major access sequence down a column of the array 200 in the order: (1) data element A; (2) data element E; (3) data element I; and (4) data element M. As this access sequence occurs on the same column of the array 200, the memory 102 may be programmed to implement a column-major physical address mapping that results in the physical addresses associated with data elements A, E, I, and M mapping to different banks for each data element, such that the physical address for data element A is mapped to the memory location at bank 111/row X, the physical address for data element E is mapped to the memory location at bank 112/row X, the physical address for data element I is mapped to the memory location at bank 113/row X, and the physical address for data element M is mapped to the memory location at bank 114/row X. The physical addresses for the data elements of the other columns of the array 200 may be similarly mapped to corresponding rows of the memory 102. Note that although FIG. 3 shows the physical addresses associated with each of data elements A, E, I, and M mapping to the same row X for ease of illustration, the physical addresses can map to different rows for the different banks. For example, data element A could map to row X of bank 111, data element B could map to row Y or bank 112, etc.

Under the physical address mapping described above, each memory access in the sequence of memory accesses to access data elements A, E, I, and M each maps to a different bank, and thus avoids the bank conflicts that otherwise would arise if two or more of the data elements A, E, I, M were stored in the same bank. As similarly described above with reference to FIG. 2, the programmable physical address mapping of FIG. 3 can be further exploited in the event that a row can store more than one data element and a row buffer is implemented.

FIG. 4 illustrates an example Z-Morton access sequence in the array 200 in the order: (1) data element A; (2) data element B; (3) data element E; (4) data element F; (5) data element C; (6) data element D; (7) data element G; (8) data element H; (9) data element I; (10) data element J; (11) data element M; (12) data element N; (13) data element K; (14) data element L; (15) data element O; and (16) data element P. In view of this anticipated access sequence, the memory 102 may be programmed to implement a physical address mapping that results in the physical addresses associated with data elements A, B, E, and F mapping to different banks for each data element, such that the physical address for data element A is mapped to the memory location at bank 111/row W, the physical address for data element B is mapped to the memory location at bank 112/row W, the physical address for data element E is mapped to the memory location at bank 113/row W, and the physical address for data element F is mapped to the memory location at bank 114/row W. Although data elements A, B, E, and F are illustrated as mapping to the same row W, these data elements instead may be mapped to different rows of different banks depending on the particular mapping implemented for each bank. Similarly, the physical address mapping would map: the physical addresses associated with the data elements C, D, G, and H to banks 111-114, respectively; the physical addresses associated with the data elements I, J, M, and N to banks 111-114, respectively; and the physical addresses associated with the data elements K, L, O, and P to banks 111-114, respectively.

Under this physical address mapping, each successive memory access for a four data element access set in the Z-Morton access pattern would hit on a different bank, and thus avoid bank conflicts that would otherwise arise if two memory accesses in the same four data element set were mapped to the same bank. As with the row-major and column-major physical address mappings of FIGS. 2 and 3, the efficiency of the illustrated Z-Morton mapping of FIG. 4 is further increased when row buffers are implemented and multiple adjacent data elements (adjacent in the sense of the Z-Morton access pattern) can be stored in the same row, thereby allowing successive memory accesses for adjacent data elements to hit the row buffers.

Figure 5:
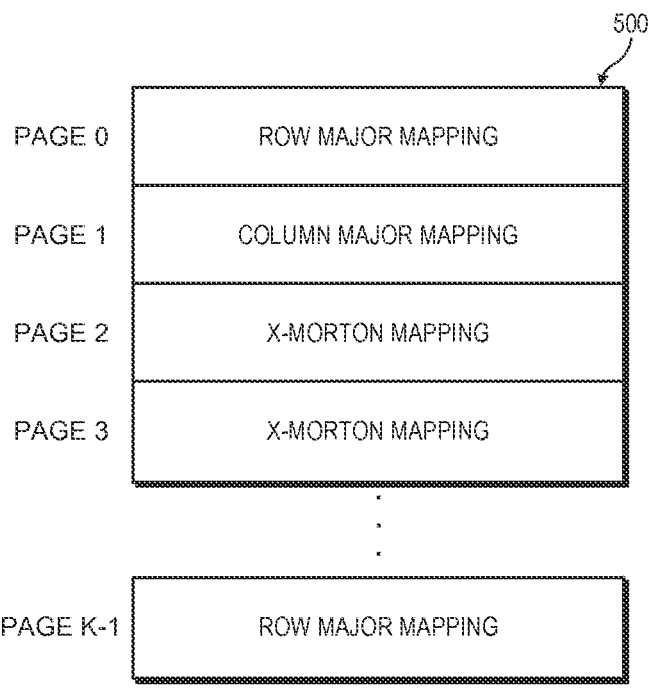
FIG. 5 is a diagram illustrating programmable physical address mappings programmed at a memory on a page-by-page basis in accordance with some embodiments of the present disclosure.

Although the memory 102 can be treated as a single monolithic region for a programmed physical address mapping, in some embodiments the memory 102 instead can be separated into different regions with respect to physical address mappings such that each region may be programmed to a different physical address mapping. For example, FIG. 5 illustrates an example whereby a physical address space 500 of the memory 102 is segregated into K pages, and the programmable address decode logic 110 can be programmed to implement a physical address mapping on a page-by-page basis. For example, the programmable address decode logic 110 could be programmed to implement a row-major physical address mapping, such as that illustrated with respect to FIG. 2, for pages 0 and page K−1, a column-major physical address mapping, such as that illustrated with respect to FIG. 3, for page 1, and an X-Morton based physical address mapping for pages 2 and 3 of the memory space 500.

Although FIG. 5 illustrates the use of pages to define the different regions for which different physical address mappings may be programmed, the present disclosure may implement other types of regions of the memory space of the memory 102 for this purpose. For example, the regions can include specified address ranges, different memory modules, different address spaces for different virtual machines, or combinations of such regions. As an example, the data processing components 104 may include an accelerated processing unit (APU) having both a central processing unit (CPU) and a graphics processing unit (GPU), and the memory 102 may be a unified system memory used both for storage of data and instructions for the CPU and for pixel data being manipulated by the GPU. As such, the GPU may have a reserved space in the memory 102 for use as a frame buffer, and a space tiling-based physical address mapping may be programmed for this reserved space so as to facilitate effective application of a fitter or other transform, whereas a row-major physical address mapping may be programmed for the space in the memory 102 used by the CPU to store instructions in anticipation of a program-order access of the instructions from memory by the CPU.

In addition to using different physical address mappings for different memory regions, the memory 102 also can dynamically reconfigure the physical address mapping for any given region based on an analysis of recent memory accesses to that region, based on hint information provided by software, or a combination thereof. As such, in response to observing a consistent strided access pattern to a particular region that is programmed to implement a row-major physical address mapping, the access analysis module 134 (FIG. 1) can reprogram the programmable address decode logic 110 to implement a column-major physical address mapping for the memory region.

Figure 6:
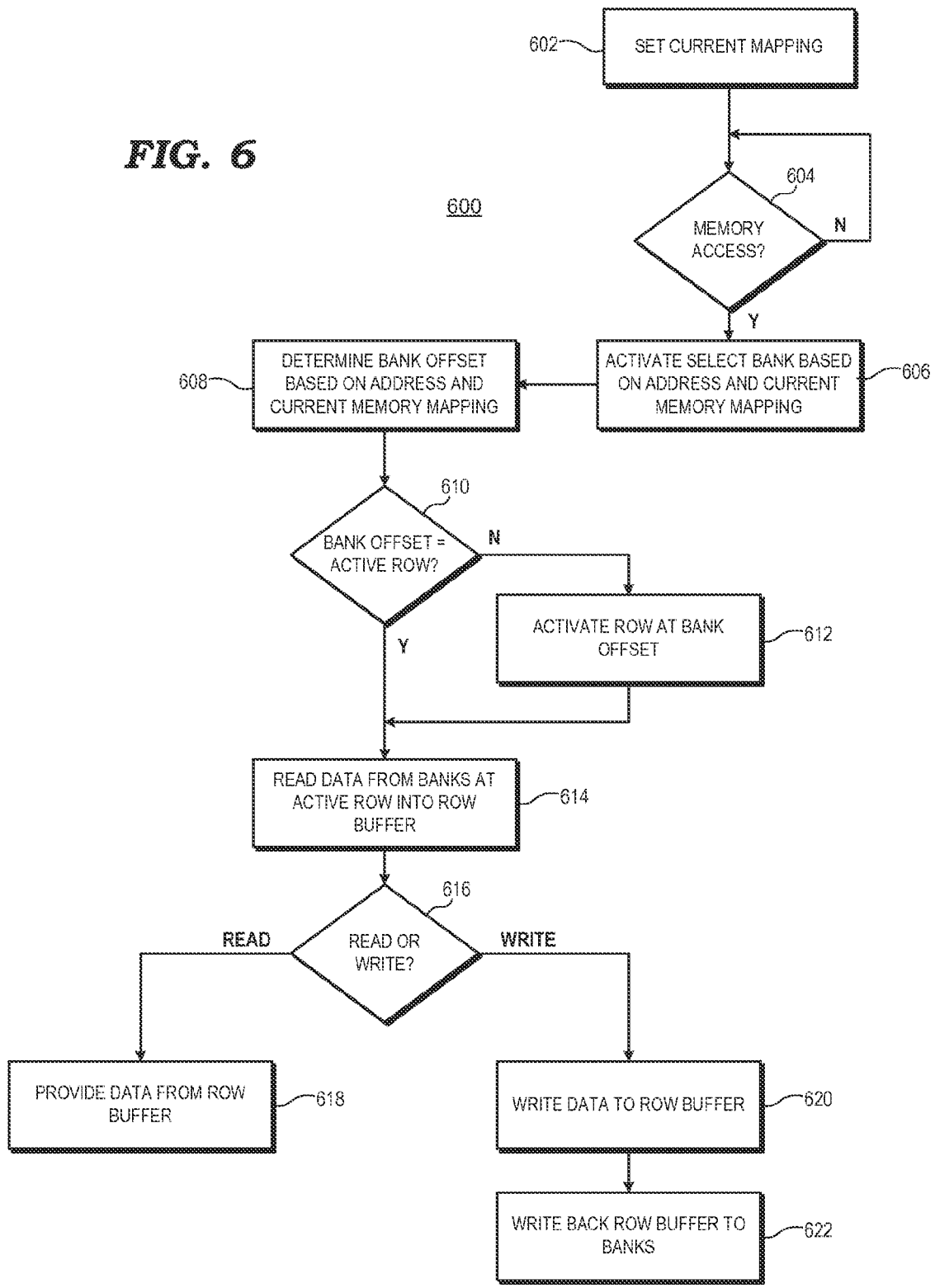
FIG. 6 is a flow diagram illustrating a method for performing a memory access using a programmable memory address mapping for a multiple-bank memory in accordance with some embodiments of the present disclosure.

FIG. 6 illustrates an example method 600 for conducting memory accesses at a memory using a programmed physical address mapping in accordance with some embodiments of the present disclosure. For ease of reference, the method 600 is described below in the example context of the memory 102 of FIG. 1. The method 600 initiates at block 602, whereby the memory 102 is programmed to implement a specified physical address mapping (referred to for the following as the "current physical address mapping"). The memory 102 can be initially programmed to a default physical address mapping during a BIOS start up, an operating system or software application may program the memory 102 to a specified physical address mapping in anticipation of the OS' or application's use of the memory 102, or the access analysis module 134 may set the current physical address mapping based on an analysis of recent memory accesses to the memory 102. As described above, the current physical address mapping may be programmed by storing a corresponding mapping indicator value to the programmable storage element 130, whereby the corresponding mapping indicator value controls which preconfigured physical address mapping is to be applied. Alternatively, the current physical address mapping may be programmed by configuring a mapping table used by the programmable address decode logic 110 or by programming reconfigurable logic to implement the current physical address mapping.

At block 604, the memory 102 monitors for a memory access request from one of the data processing components 104, which in turn would trigger a memory access. To initiate a memory access in response to a memory access request, at block 606 the bus interface 108 supplies the physical address ADDR of the memory access request to the programmable address decode logic 110, and from the physical address ADDR and the current physical address mapping, the programmable address decode logic 110 determines which of the plurality of banks 111-114 is mapped to the physical address ADDR. In some embodiments, each bank decode logic 121-124 implements its bank select logic 126 to determine whether the corresponding bank is to be accessed. At block 608, the programmable address decode logic 110 determines the bank offset based on the physical address ADDR and the current physical address mapping. In some embodiments, each of the bank offset logic 128 of the bank to be accessed is used to determine the row of the bank to be accessed based on the physical address ADDR. The process of block 608 can be performed concurrent with the process of block 606 such that each bank offset logic 128 determines a bank offset based on the physical address ADDR and the current physical address mapping and then only the bank offset associated with the selected bank is enabled. Alternatively, the bank offset logic 128 may be enabled in response to the bank select logic 126 determining whether the corresponding bank is to be accessed.

At block 610, the memory 102 determines whether the row identified by the bank offset is the active, or "open," row of the memory 102. If the identified row is not the active row, at block 612 the memory 102 closes/precharges the current active row and then activates the row identified by the bank offset. If the identified row and the active row are the same row, no closing or activation of rows typically is needed. When the memory 102 has verified that the row identified by the bank offset is activated, at block 614, the memory 102 then reads the data from the activated row of the selected bank into the corresponding row buffer.

At block 616, the memory 102 determines whether the memory access is a read access or a write access. If the memory access is a read access, at block 618 the memory 102 accesses the requested read data from the row buffer and provides the read data for output to the requested data processing component 104. If the memory access is a write access, at block 620 the memory 102 stores the write data to the corresponding location of the row buffer, thereby overwriting the previous data at that location, and at block 622 the memory 102 writes the data stored at the row buffer back to the corresponding bank. In some embodiments, only the modified data is written back to the corresponding bank. In other embodiments, the entire row buffer is written back to the row of the corresponding bank. After concluding the process of block 618 or the process of block 622, the method 600 returns to block 604 to await the next memory access request.

Figure 7:
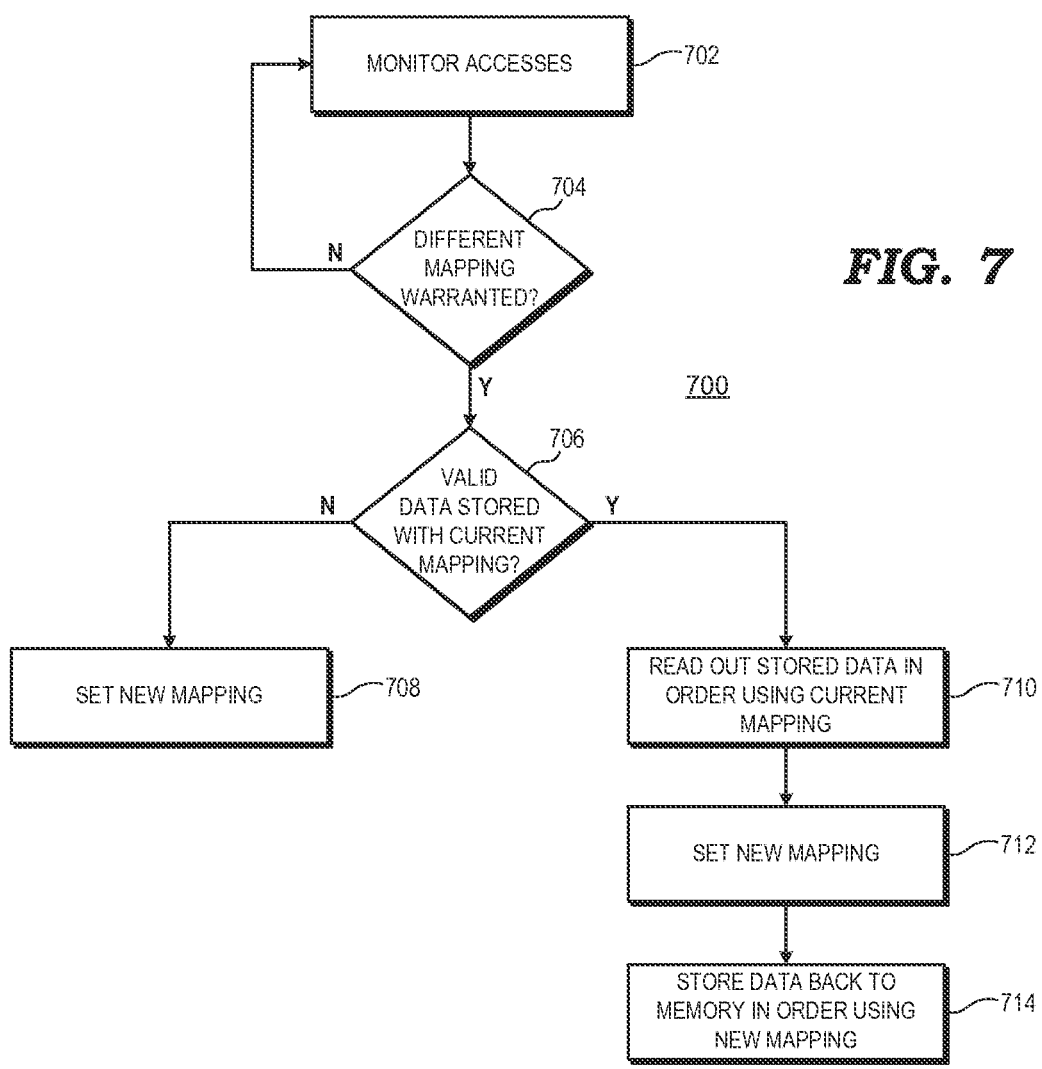
FIG. 7 is a flow diagram illustrating a method for dynamically reconfiguring a programmable memory address mapping for a multiple-bank memory in accordance with some embodiments of the present disclosure.

FIG. 7 illustrates an example method 700 of dynamically reprogramming the physical address mapping implemented by a memory in accordance with some embodiments of the present disclosure. For illustrative purposes, the method 700 is described in the example context of the memory 102 of FIG. 1 and with reference to the method 600 of FIG. 6. The method 700 initiates at block 702, whereby the access analysis logic 134 monitors memory accesses performed by the memory 102 in accordance with the current physical address mapping being implemented by the memory 102. In some embodiments, the access analysis logic 134 monitors the memory accesses by attempting to detect an access pattern in the physical addresses associated with recent memory accesses. As noted above, this access pattern can include, for example, a strided pattern, an access pattern indicative of a particular space tiling pattern, and the like. At block 704, the access analysis module 134 determines whether there is an access pattern in the recent memory accesses, and if there is a detected access pattern, whether a physical address mapping other than the current physical address mapping would be warranted (that is, would provide for more efficient memory accesses based on the anticipated access pattern going forward). In another embodiment, an anticipated access pattern may be identified or suggested by an external component, such as software executed on a data processing component 104, via memory utilization hint information 136. In the event that the access analysis module 134 is unable to identify an access pattern, is unable to identify an improved physical address mapping for an identified access pattern, or no memory utilization hint information 136 is forthcoming, the access analysis module 134 maintains the current physical address mapping.

Otherwise, if a new physical address mapping is warranted or suggested, the memory 102 initiates the process of reprogramming the memory 102 to the new physical address mapping. Given a change in physical address mapping, any valid data stored in the memory 102 under the "old" physical addressing could be rendered inaccessible unless the locations at which the valid data are stored are transposed to the new physical address mapping. Accordingly, at block 706 the memory 102 determines whether valid data is stored at the memory 102 under the "old" physical address mapping. If no valid data is so stored, at block 708 the access analysis module 134 programs the memory 102 to implement the identified physical address mapping as the current physical address mapping (e.g., with respect to the process of block 602 of method 600 of FIG. 6). The access analysis module 134 can program the memory 102 to implement the new physical address mapping by, for example, storing a corresponding mapping indicator value to the programmable storage element 130, configuring a mapping table with mapping information representative of the new physical address mapping, and the like.

Otherwise, if valid data is stored at the memory 102 under the "old" physical address mapping, the memory 102 initiates the process of transposing the physical address mapping of the stored valid data. At block 710, the stored valid data is read out of the memory 102 using the "old" physical address mapping. At block 712, the access analysis module 134 programs the memory 102 to implement the new physical address mapping in the manner described with respect to block 708, and at block 714 the valid data is read back into the memory 102 in accordance with the new physical address mapping.

In some embodiments, the process of transposing the physical address mapping as represented by blocks 710, 712, and 714 is software-transparent; that is, it is handled by the hardware of the memory 102 without the involvement of software executed by the data processing components 104. For example, the memory 102 can include hardware to temporarily buffer in a portion of the memory space valid data read out of the memory 102 at block 710 and then rewrite the valid data to the new memory locations under the new physical address mapping at block 714. In another embodiment, the process of transposing the physical address mapping is managed by software or otherwise managed by a component external to the memory 102. For example, in response to determining that valid data is stored at the memory 102 at block 706, the memory 102 could generate an exception that initiates an interrupt handling routine by a data processing component 104, whereby the interrupt handling routing manages the reading out of the valid data at block 710 and the writing of the valid data back to the memory 102 at block 714.

In some embodiments, memory described above is implemented as one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform a least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based memory), or coupled to the computer system via a wired or wireless network (e.g., network accessible storage (NAS)).

Figure 8:
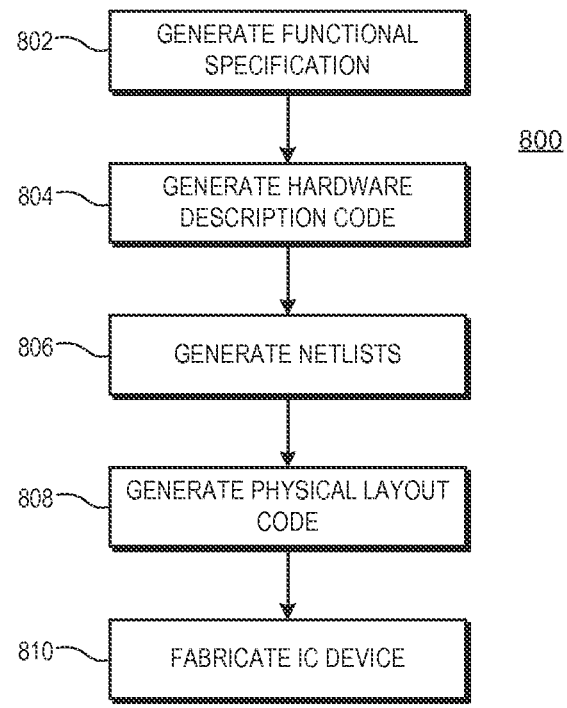
FIG. 8 is a flow diagram illustrating a method for designing and fabricating an integrated circuit device implementing at least a portion of a multiple-bank memory in accordance with some embodiments of the present disclosure.

FIG. 8 is a flow diagram illustrating an example method 800 for the design and fabrication of an IC device implementing one or more aspects of the present invention in accordance with some embodiments of the present disclosure. As noted above, the code generated for each of the following processes is stored or otherwise embodied in computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System-Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims.

What is claimed is:

1. A memory comprising:
   a set of memory cells arranged as a plurality of rows and one or more banks;
   address decode logic having programmable physical address mapping, the address decode logic to select a bank and a row of the selected bank for a memory access based on the programmable physical address mapping and a physical address associated with the memory access, the address decode logic comprising:
   a plurality of mapping tables, each mapping table representing a corresponding physical address mapping of a plurality of physical address mappings including the programmable physical address mapping;
   a programmable storage element to store an indicator of a selected mapping table of the plurality of mapping tables; and
   logic coupled to the programmable storage element and having access to the selected mapping table, the logic to perform a lookup into the selected mapping table to determine which bank is to be accessed for the memory access and to determine a bank offset identifying a row of the bank to be accessed for the memory access, wherein the logic is to perform the lookup using the physical address associated with the memory access; and
   access analysis logic to determine an access pattern of memory accesses to the memory, to select a physical address mapping based on the access pattern, and to program the address decode logic to implement the selected physical address mapping, wherein the access analysis logic is to select a column-major address mapping as the physical address mapping responsive to the access pattern identifying a stride patterns greater than one and to select a row-major address mapping as the physical address mapping responsive to the access pattern identifying a stride, pattern equal to one.

2. The memory of claim 1, wherein the programmable physical address mapping includes a space tiling physical address mapping.

3. The memory of claim 1, wherein:
the address decode logic comprises bank decode logic for each bank, the bank decode logic to determine, based on the physical address and the programmable physical address mapping, whether the bank corresponding to the bank decode logic is to be accessed for the memory access and, responsive to determining the corresponding bank is to be accessed for the memory access, to determine a bank offset identifying a row of the bank corresponding to the bank decode logic to be accessed for the memory access.

4. The memory of claim 3, wherein the memory further comprises:
a row buffer to buffer data at an accessed row of a corresponding bank; and
the memory is to perform the memory access using the row buffer responsive to determining the identified row is the accessed row of the corresponding bank.

5. The memory of claim 1, wherein the mapping tables are programmable.

6. The memory of claim 1, wherein the access analysis logic further is to select the physical address mapping based on hint information provided from a component external to the memory.

7. The memory of claim 1, wherein, for data stored at the memory according to a previous physical address mapping, the memory is to restore the data at the memory according to the selected physical address mapping.

8. The memory of claim 1, wherein the memory further comprises:
a row buffer to buffer data at an accessed row of an accessed bank; and
the access analysis logic is to select a physical address mapping expected to improve a frequency at which successive memory accesses map to the accessed row stored in the row buffer.

9. In a memory comprising one or more banks, a method comprising:
determining an access pattern of memory accesses to the memory;
selecting a column-major address mapping as a first physical address mapping responsive to the access pattern identifying a stride patterns greater than one and selecting a row-major address mapping as the first physical address mapping responsive to the access pattern identifying a stride pattern equal to one'
programming address decode logic of the memory to implement the first physical address mapping represented by a first mapping table selected from a plurality of mapping tables maintained at the memory, each mapping table representing a corresponding physical address mapping of a plurality of physical address mappings;
performing, using the address decode logic, a lookup into the first mapping table to select a first bank of the one or more banks and to select a first row of a plurality of rows of the first bank, wherein the lookup is performed using a first physical address associated with a first memory access; and
performing the first memory access using the first row of the first bank.

10. The method of claim 9, wherein programming the address decode logic to implement the first physical address mapping comprises storing a value to a programmable storage element that controls which mapping table of the plurality of mapping tables is implemented by the address decode logic.

11. The method of claim 9, wherein:
the first physical address mapping is implemented for a first memory region of a plurality of memory regions; and
performing the lookup to select the first bank and to select the first row based on the first physical address mapping is responsive to the first memory region encompassing the first physical memory address; and
wherein the method further includes:
programming the address decode logic to implement a second physical address mapping for a second memory region of the plurality of memory regions, the second physical address mapping represented by a second mapping table selected from the plurality of mapping tables;
performing, using the address decode logic, a lookup into the second mapping table to select a second bank of the one or more banks and to select a second row of a plurality of rows of the second bank based on a second physical address associated with a second memory access responsive to the second memory region encompassing the second physical memory address; and
performing the second memory access using the second row of the second bank.

12. The method of claim 9, further comprising:
programming the address decode logic to implement a second physical address mapping represented by a second mapping table selected from the plurality of mapping tables;
performing, using the address decode logic, a lookup into the second mapping table to select a second bank of the one or more banks and to select a second row of a plurality of rows of the second bank based on a second physical address associated with a second memory access; and
performing the second memory access using the second row of the second bank.

13. The method of claim 12, further comprising:
selecting the second physical address mapping for implementation responsive to an analysis by the memory of memory accesses performed using the first physical address mapping.

14. The method of claim 12, further comprising:
selecting the second physical address mapping further based on hint information provided from a component external to the memory.

15. The method of claim 12, further comprising:
transposing data stored at memory locations based on the first physical address mapping to memory locations based on the second physical address mapping responsive to programming the address decode logic to implement the second physical address mapping.

16. The method of claim 15, wherein transposing the data comprises:

reading the data from the memory to temporary storage using the first physical address mapping; and storing the data back to the memory from the temporary storage using the second physical address mapping.

17. In a memory comprising one or more banks, a method comprising:

programming, at a first time, address decode logic of the memory to implement a first physical address mapping;

performing memory accesses to the memory based on the first physical address mapping;

selecting a second physical address mapping based on an analysis of the memory accesses performed using the first physical address mapping;

programming, at a second time subsequent to the first time, the address decode logic to implement the second physical address mapping; and performing memory accesses to the memory based on the second physical address mapping;

wherein:

the analysis includes detection of a stride pattern in the memory accesses; and selecting the second physical address mapping comprises:

selecting a column-major physical address mapping as the second physical address mapping responsive to detecting a stride pattern greater than one; and selecting a row-major physical address mapping as the second physical address mapping responsive to detecting a stride pattern equal to one.

* * * * *